United States Patent [19]

Alimanestianu

[11] 3,845,717

[45] Nov. 5, 1974

[54] VEHICLE TRAFFIC HANDLING SYSTEM

[76] Inventor: Mihai Alimanestianu, 4 Locust Dr., Upper Nyack, N.Y. 10960

[22] Filed: Nov. 18, 1971

[21] Appl. No.: 200,094

Related U.S. Application Data

[63] Continuation-in-part of Ser. No. 767,898, Sept. 12, 1968, abandoned, which is a continuation-in-part of Ser. No. 546,317, April 29, 1966, abandoned.

[52] U.S. Cl. ............... 104/26, 104/88, 187/75, 214/16.1 CE
[51] Int. Cl. ............................................. B61b 1/00
[58] Field of Search .............. 187/75; 214/16.1 CE; 104/26, 88, 25–28

[56] References Cited
UNITED STATES PATENTS

| | | | |
|---|---|---|---|
| 1,152,318 | 8/1915 | Howarth | 187/75 |
| 2,722,322 | 11/1955 | Gunjerson | 214/16.1 CE |
| 2,901,130 | 8/1959 | Thomas | 214/16.1 CE |
| 3,040,913 | 6/1962 | Foster, Jr. et al. | 214/16.1 CE |

*Primary Examiner*—M. Henson Wood, Jr.
*Assistant Examiner*—Richard A. Bertsch
*Attorney, Agent, or Firm*—Philip G. Hilbert

[57] ABSTRACT

A transport system including pallets for carrying vehicles, containers and the like; the pallets moving in a determined traffic path, together with means for handling loaded and unloaded pallets for movement toward and away from the determined path at selected points in the path. The unloaded pallets are arranged for transfer and/or accumulation between spaced points in the path at a level other then the level of the path, or accumulated at a single point at a level other then the level of the path, whereby to avoid interference with traffic movements on the path and to and from the path on the level of the path.

11 Claims, 17 Drawing Figures

PATENTED NOV 5 1974

INVENTOR.
Mihai Alimanestianu

BY
Philip S. Hilbert
ATTORNEY

VEHICLE TRAFFIC HANDLING SYSTEM

This application is a continuation in part of application Ser. No. 767,898, filed Sept. 12, 1968, now abandoned which is a continuation in part of application Ser. No. 546,317, filed Apr. 29, 1966 now abandoned.

BACKGROUND OF THE INVENTION

The construction costs of highways, tunnels and bridges necessarily limits the number of traffic lanes thereof and the usual location of such arterial constructions in urban or other congested areas, imposing traffic loads in excess of the actual capacity of such throughways. If the theoretical throughput capacity of the artery could be realized or at least approximated, traffic loads imposed thereon could be handled with a marked reduction in delays and congestion of traffic.

In addition, vehicle breakdowns, accidents and substantial variations in the driving patterns of individual vehicle drivers, further serves to markedly reduce the actual number of vehicles passing through the artery per unit of time, as compared to the theoretical capacity of the artery which could be realized if the vehicles could move at a uniform increased speed and fairly close spacing.

The problem of increasing the vehicle handling capacity of a given artery can be solved, if the vehicles, containers or the like are individually transported on suitable pallets which are arranged for uniform movement at a given high rate of speed, together with reduced, automatically controlled spacing between successive pallets. Thus, the transport means could move at speeds of 60 m.p.h. or more, as compared to the usual maximum speeds of 40 m.p.h. or less. Also, the spacing between successive pallets can be reduced to as little as 20 to 22 feet, as compared to the usual 75 to 100 feet spacings dictated by safety precautions.

Accordingly, an object of this invention is to provide an improved transport system of carriers or pallets for transporting vehicles, containers or the like over a high traffic density artery to maximize the actual carrier capacity of the artery.

The use of carriers or pallets for transporting vehicles, containers or the like, present a number of problems in respect to the transfer or accumulation of unloaded pallets. In a looped path system, the unloaded pallets must be transferred between different terminal points in the path without interfering with normal traffic movements of vehicles moving toward or away from the terminal points in the path. In a non-looped path system, as well as in the looped path system, provision must be made for accumulating and storing unloaded pallets in accordance with variations in traffic movements in the path systems.

Accordingly, a further object of this invention is to provide an improved pallet transport system for looped and non-looped arterial paths wherein unloaded pallets may be transferred or accumulated at a level other than the level of the traffic carrying paths to thereby avoid interference with traffic movements in the paths.

Another object of this invention is to provide a system of the character described for a lane constricted path as in a highway, tunnel or bridge, wherein carriers move in a closed loop with means for introducing unloaded carriers into the loop and allowing loaded carriers to move in the loop and to leave the same at determined points, all without interference with traffic movements in the loop.

A further object of this invention is to provide in a vehicle carrier system of the character described, wherein the carriers move in a given path in longitudinal successive relation, means for controlling the movement of the carriers so as to divert the respective carriers at a given point in the path into angularly related paths so that the carriers may move in lateral relation to each other to a vehicle unloading point.

Still another object of this invention is to provide in a system of the character described, a plurality of laterally related stations with carriers at each station for respectively receiving thereon a single vehicle, the loaded carriers thereafter moving in timed succession in convergent paths to serially reach an apex of said convergent paths and thereafter moving with controlled spacing and speed serially in a single traffic lane.

Still a further object of this invention is to provide in a system of the character described, means for propelling the vehicle carriers or pallets, together with control means for directing the carriers in multilane paths which respectively converge and diverge at spaced points in a main path of travel.

Yet another object of this invention is to provide in a loop system of the character described, improved means for transferring unloaded carriers or pallets at given terminal points for reloading and further movement in the loop in a different or the same direction.

Still another object of this invention is to provide a carrier or pallet moving system, means for propelling the carriers or pallets, means for automatically controlling the movement of the carriers in selected paths with determined speeds and spacings for the carriers.

Yet another object of this invention is to provide a carrier system for a highway portion with carriers movable over the highway portion for transporting vehicles and the like between selected points in the highway portion with loading and unloading stations at said points, together with means for transferring unloaded carriers at a level other then the level of said highway portion between said stations.

Still another object of this invention is to provide in a carrier system of the character described, means at combination entrance and exit points in a given arterial path, for handling loaded carriers leaving said path for unloading and for loading carriers entering said path under conditions avoiding traffic conflicts at said points.

Other objects of this invention will in part be obvious and in part hereinafter pointed out.

BRIEF DESCRIPTION OF THE DRAWINGS

In the drawings,

FIG. 9 is a transverse sectional view showing a vehicle carrier located in a lane of a tunnel or the like;

DESCRIPTION OF THE PREFERRED EMBODIMENTS

The traffic handling system of the instant invention is essentially based on the use of separate carriers or pallets for carrying vehicles or the like which are adapted to be loaded and unloaded; the loaded carriers being propelled at optimum speeds and spacings in the lanes of a highway, bridge, tunnel or the like, so as to approximate the theoretical traffic carrying capacity of the same.

Further, the system makes optimum utility of the carriers for movement in a closed loop or unidirectional path, the carriers being loaded or unloaded at selected points in said path, in a manner to provide for storage of unloaded vehicles not immediately required and to avoid interference with traffic movements towards and away from the points in said path.

Also, the carriers have controlled movements such that on reaching a given point in a single lane of carriers, the successive carriers move in respectively divergent paths to locate the carriers in laterally related paths beyond the given point; and further, to move carriers located in a plurality of laterally related related paths, in converging paths so as to continue their movement beyond the apex of convergency in serial fashion in a single path.

Figure 1:
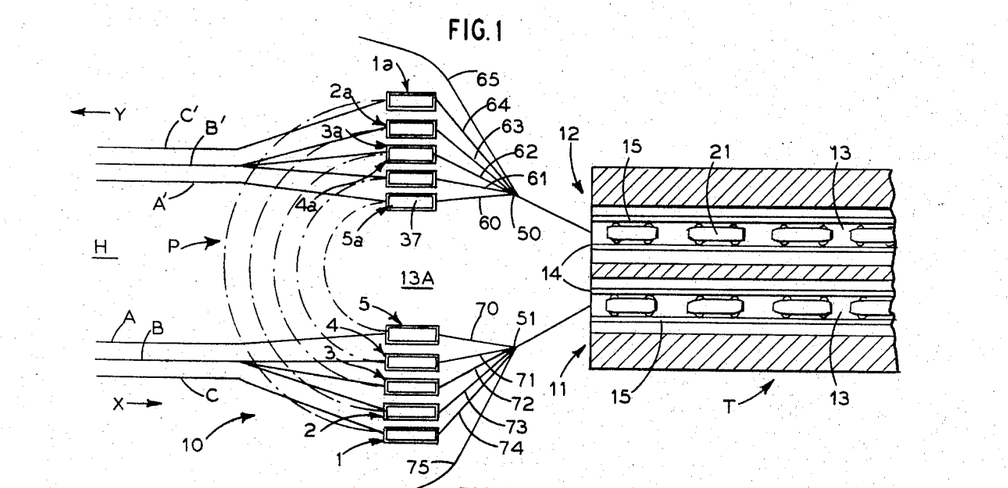
FIG. 1 is a schematic showing of a vehicle handling system embodying the invention, as applied to a highway, tunnel, bridge or other artery.

Thus, as shown in FIG. 1, 10 designates a traffic handling system embodying the invention. The same is shown by way of illustration, as applied to a tunnel T having lanes 11, 12 for carrying traffic in opposite directions; a single lane being shown for each direction, for simplicity of illustration. Each of the lanes 11, 12 is defined by the usual floor or pavement 13 and lateral guide rails 14, 15 raised above the same, for the purpose hereinafter appearing.

Whereas in conventional tunnels, bridges, highways and the like, vehicles move through and over the same under their own power; in the system of the instant invention, each vehicle, indicated at V moving in a multi-lane highway H, in opposite directions indicated at X and Y, are carried through tunnel T on carriers or pallets 20 provided for the purpose. Thus, vehicles moving in direction X toward tunnel T, in lanes A, B and C may fan out and approach a series of laterally related loading stations immediately in advance of the entrance to lane 11, and indicated as 1, 2, 3, 4 and 5.

Also, vehicles V transported on individual carriers 20 coming out of tunnel T by way of lane 12, fan out and approach a series of laterally related unloading stations 1a, 2a, 3a, 4a and 5a, where the vehicles pass from their individual carriers 20 to continue on highway H in direction Y, as in lanes A', B' and C'.

Figure 3:
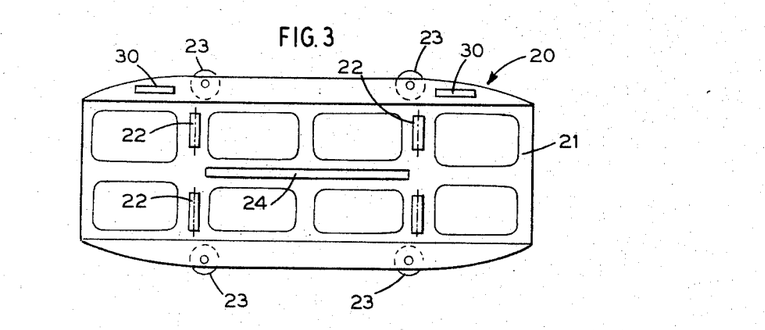
FIG. 3 is a bottom plan view of a vehicle carrier.
Figure 4:
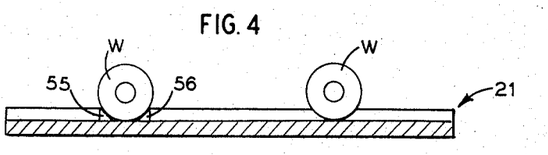
FIG. 4 is a side elevational view thereof.
Figure 5:
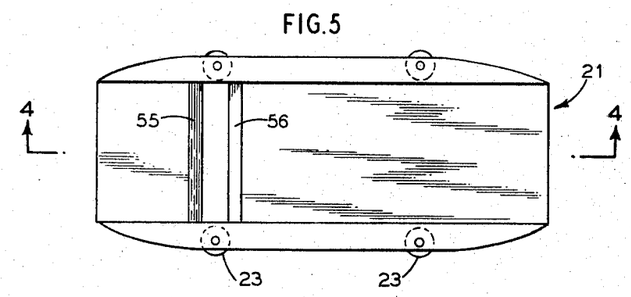
FIG. 5 is a top plan view thereof.

Carriers or pallets 20 comprise a flat bedded member 21 which may be suspended over pavement 13 in lanes 11, 12 as well as the approaches thereto from loading and unloading stations 1–5; 1a–5a, by air cushion means well known in the art, not shown, whereby pallets 21 hover immediately above pavement 13 in a known manner. Further, small diameter rollers 22 mounted on the underside of pallets 21 provide further means for supporting the moving pallets on pavement 13. Idler rollers 23 mounted on vertical axes on the sides of pallets 21 are adapted to engage the guide rails 14, 15 in lanes 11, 12 to maintain the same in a given path in said lanes.

The pallets 21 may be propelled in any suitable manner, and by way of illustration, such propulsion means may take form of known linear actuator systems, wherein an armature member 24 is mounted on the underside of pallet 21 and stator means 25 is fixed in pavement 13 in alignment with armature 24 on pallets 21. The stator means 25 comprises windings arranged for energization along the longitudinal extent thereof, with power inputs regulated by suitable switching means, not shown, all in a manner known in the art, whereby pallets 21 may be propelled in lanes 11, 12 as well as the approaches and exits thereof, and further in arcuate transfer paths indicated in dot-dash lines between stations 1–5 and 1a–5a.

Means is alos provided for guiding the movement of pallets 21, particularly in the areas about stations 1–5; 1a–5a. To this end, electromagnetic guide means is provided in the form of armature members 30 mounted on pallets 21 and stator windings 31 located in surface portions over which pallets 20 travel; said windings 31 being particularly located to define desired paths of movement for pallets 21. Windings 31 are adapted to be supplied with electrical energy from a source not shown, together with switching means for selectively energizing windings 31 along a particular path.

Figure 2:
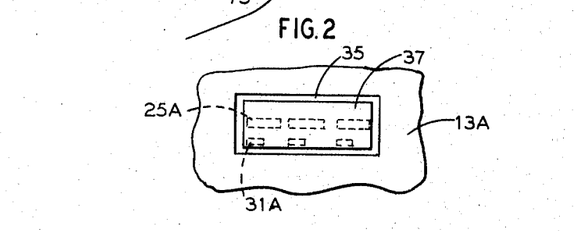
FIG. 2 is a plan view showing an individual loading or unloading station for vehicle carriers or pallets.

Each of the stations 1–5; 1a–5a is defined by a rectangular opening 35 in the pavement 13A adjacent lanes 11, 12 of tunnel T which lead to a transfer passageway 36 which is of arcuate extent as indicated in FIG. 1 and connects openings 35 in stations 1–5 with corresponding openings 35 in stations 1a–5a. The openings 35 are of a size to receive pallets 21. In each of openings 35 there is disposed a support platform 37 arranged for vertical movement on a supporting piston 38.

Figure 10:
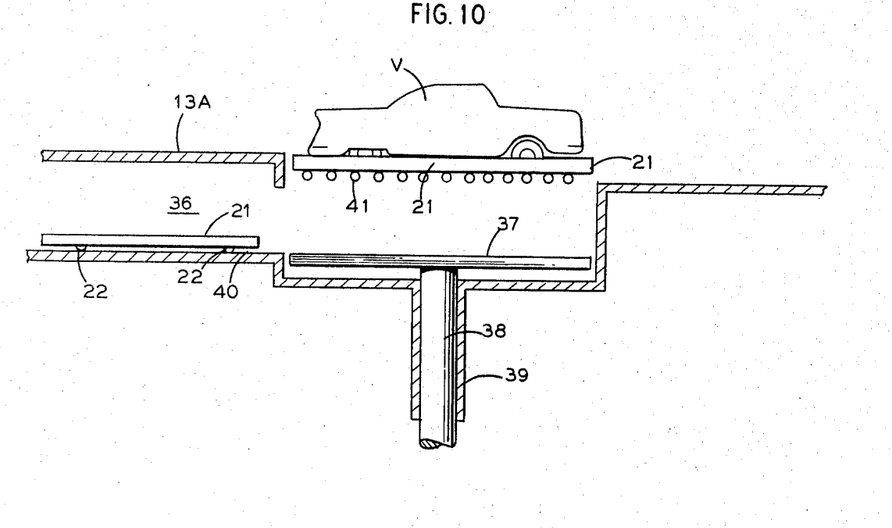
FIG. 10 is a side elevational view showing a vehicle loading station.

Piston 38 moves in a hydraulic cylinder 39 whose upper end is adjacent the depressed level 40 of passageway 36; allowing unloaded pallets 21 to be carried to level 40 where energization of propulsion windings 25A and guide windings 31A on platforms 37, as well as corresponding windings 25, 31 in level 40, effects movement of the unloaded pallets 21 from the platforms 37 and in arcuate paths P to corresponding platforms 37 aligned with openings 35 in stations 1–5, where the pallets are raised to level 13A, supported temporarily by means hereinafter described while platforms 37 are depressed to level 40 and pallets are loaded with vehicles V from lanes A, B and C.

Figure 7:
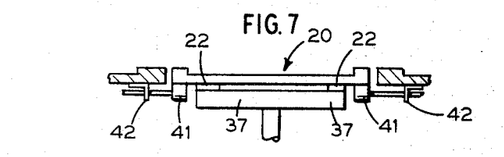
FIG. 7 is a side elevational view showing supporting means for the vehicle carriers, in a raised position.
Figure 8:
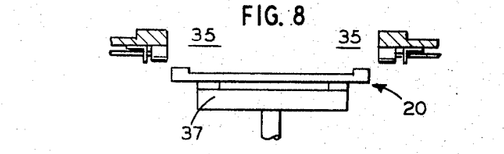
FIG. 8 is a view similar to that of FIG. 7, showing the supporting means in depressed position.
Figure 9:
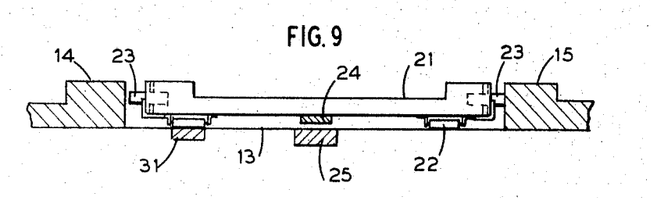

Means is provided, FIGS. 7, 8, for supporting pallets 21 in openings 35 while platforms 37 are in position to support said pallets. Such means comprises a series of rollers 41 mounted in brackets 42 on either side of openings 35. Rollers 41 are movable between advanced, supporting positions, and retracted, inoperative positions, by motor means, not shown, and further said rollers may be positively rotated by motor means, not shown.

Thus, loaded pallets 21, propelled by windings 25 and guided by windings 31, approach unloading stations 1a–5a; and with rollers 41 in their advanced positions, move the loaded pallets 21 over openings 35 and support the same until rising platforms 37 engage the pallets. The vehicles V then driving off pallets 21, the rollers 41 are retracted allowing platforms 37 to be depressed to level 40 where propulsion and guide windings 25A, 31A operate as described above. Pallets 21 raised to level 13A at stations 1–5, are again temporarily supported by rollers 41 in their advanced positions, loaded with vehicles V from lanes A, B, C and started toward lane 11 by rotating rollers 41.

Figure 11:
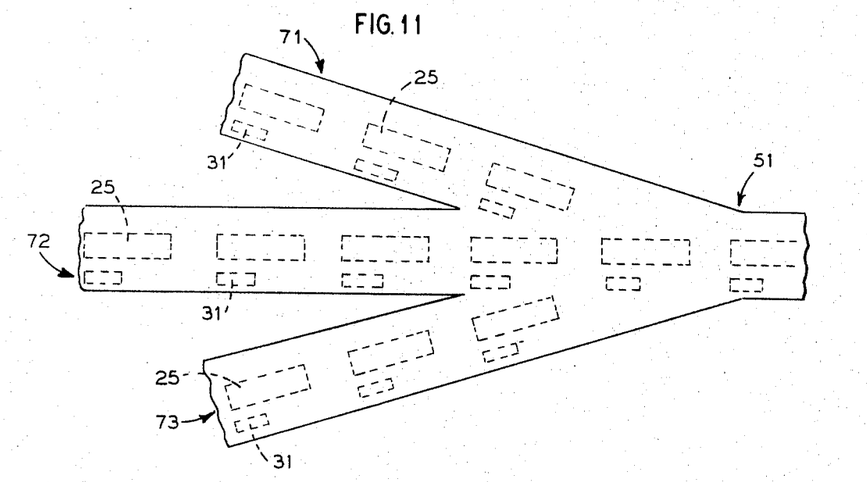
FIG. 11 is a plan diagrammatic view showing the multilane feed to a single lane path.

As vehicle traffic at stations 1–5; 1a–5a is multilane in effect, while the input to lane 11 and the output from lane 12 of tunnel T is single lane traffic, the pallets 21 loaded and moving toward and away from tunnel T must take divergent paths approaching stations 1a–5a and convergent paths when moving from stations 1–5 toward lane 11.

Accordingly, loaded pallets 21 from lane 12 when reaching a point 50, are separated and switched into individual divergent paths 60–64 to approach stations 1a–5a, by regulation of the enrgization of propulsion windings 25 and guide windings 31 in said paths 60–64 to activate said paths in sequence.

Similarly, pallets 21 leaving stations 1–5 and approaching lane 11, moving in convergent paths 70–74, enter said paths 70–74 in a switched, sequential manner, by suitable sequential energization of propulsion windings 25 and guide windings 31 in the respective paths, thus permitting pallets 21 to reach point 51 in sequence and to pass point 51 in a single lane. By suitable control of the switching system supplying energy to the windings in paths 70–74, a predetermined pattern of movement of vehicle loaded pallets 21 toward and through lane 11 of tunnel T may be established, including speed and spacing regulation of said pallets.

With a programmed pattern for the movement of pallets 21 towards and away from stations 1–5; 1a–5a, changes in traffic volume in directions X, Y may result in varying numbers of vacant pallets in lands 11, 12. Weight sensing control means, not shown, is provided at stations 1–5; 1a–5a, to prevent premature movement of a pallet 21 from a given station before fullloading or unloading thereof.

Figure 6:
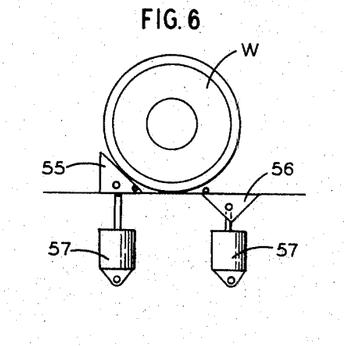
FIG. 6 is a side elevational view showing means for chocking a vehicle on the carrier or pallet.

Pallets 21 may be provided with suitable means for chocking the front wheels W of a vehicle V as the same is positioned on the pallet. Thus, as shown in FIGS. 5, 6, parallel blocks 55, 56 of triangular shape are mounted transversely of the top surface of the pallets for pivoted movement by hydraulic motor means 57, between a depressed inoperative position and a raised, operative position, to effectively keep the vehicle secure on pallet 21.

The system of the instant invention lends itself to handling vehicles V on highways other than highway H, in respect to tunnel T. Thus, a lane of traffic 65 coming out of tunnel lane 12, still loaded on pallets 21, may move from point 50 beyond stations 1a–5a and continue in said lane 65 in a highway other than highway H to a determined point therein, where an arrangement of unloading stations, similar to that of stations 1a–5a is provided. Here the unloaded pallets 21 are transferred to a lane 75 for reloading with vehicles and movement in the opposite direction to point 51 where such loaded pallets also enter lane 11 of tunnel T.

Figures 12, 13:
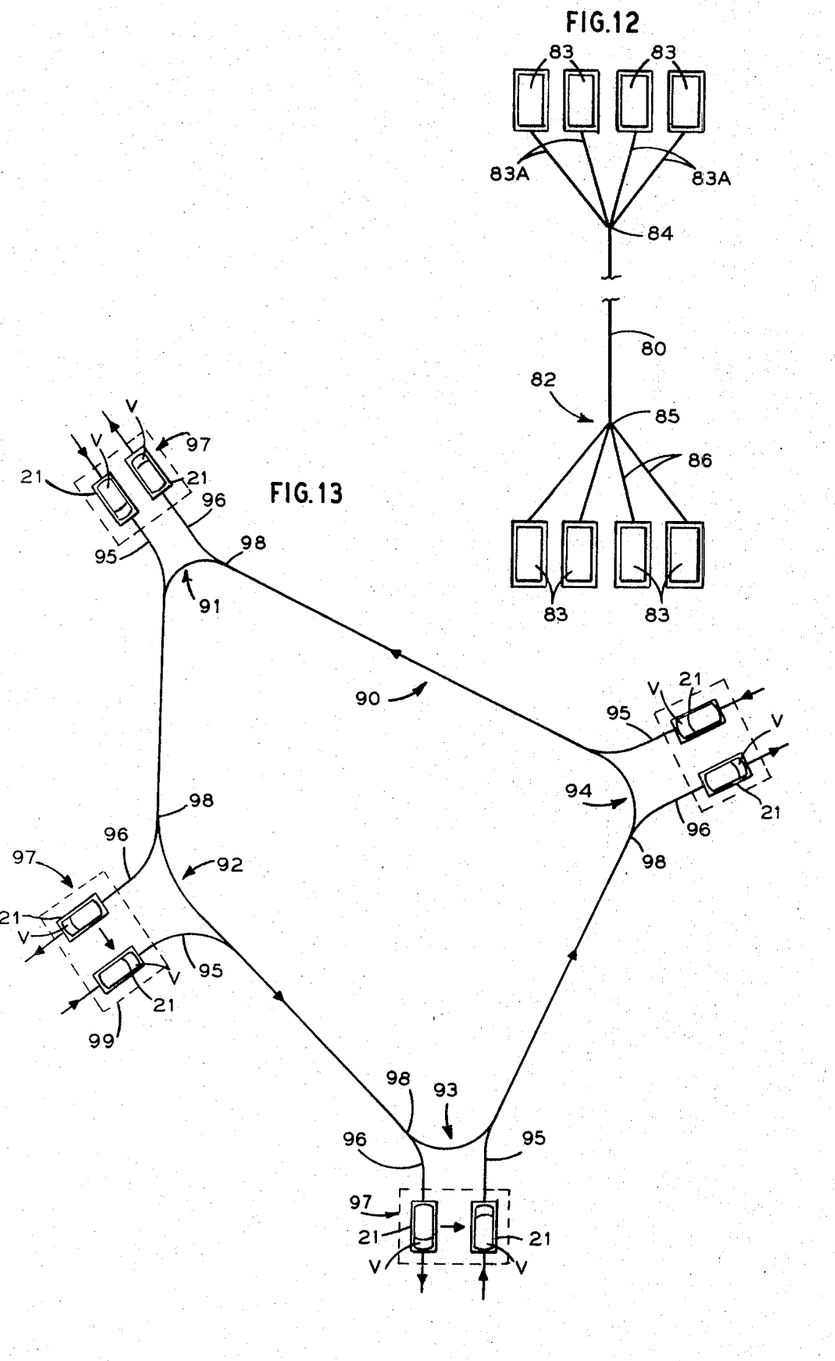
FIG. 12 is schematic view showing another embodiment of the invention.
FIG. 13 is a schematic view showing another loop system embodying the invention.

The instant invention may be further embodied in a unidirectional single artery, as shown in FIG. 12, at 80. Artery 80 may have terminal points 81, 82. Pallets 83 such as those previously described, may be loaded as at station 81, the loaded pallets being located in laterally related lanes 83A. The pallets 83 are moved to apex 84 in a serial fashion, as previously described, and then move on artery 80 to station point 85 where the pallets 83 are switched to lanes 86.

After unloading pallets 83 at station 82, the same may be moved to a storage level which is different from the level of artery 80, by means previously described. Sufficient storage provision may be made corresponding to the traffic density on artery. Further, the direction of traffic movement on artery 80 may be reversed at set time intervals, allowing traffic flow in both directions, and ultility of the unloaded pallets in their return movements.

In another embodiment of the invention, shown in FIG. 13, an endless looped artery serves a heavy traffic density area and connects points 91–94 at which points pallets 21 may enter or leave the artery, which is unidirectional. Loaded pallets 21 enter artery 90 by way of feed lanes 95 at each of points 91–94, while pallets leaving artery 90 move on exit lanes 96 at each of said points. The loaded pallets 21 are unloaded at areas 97, where the vehicle V drives off the pallet 21. The thus unloaded pallet 21 is then shifted laterally to lane 95 by slide means generally indicated at 99. Thus the unloaded pallet 21 is ready to receive a vehicle V which is to be moved on artery 90.

It will be apparent that pallets 21 entering at any one of points 91–94, may exit at any other point by merely continuing on artery 90. Suitable switching means 98 at the intersection of lanes 96 and artery 90, allows for exit of the pallets 21 at the appropriate point 91–94, through switching means previously described. Further, pallets 21 not immediately required after unloading, may be moved to a level other then the level of artery 90, for storage, as previously described.

Figure 14:
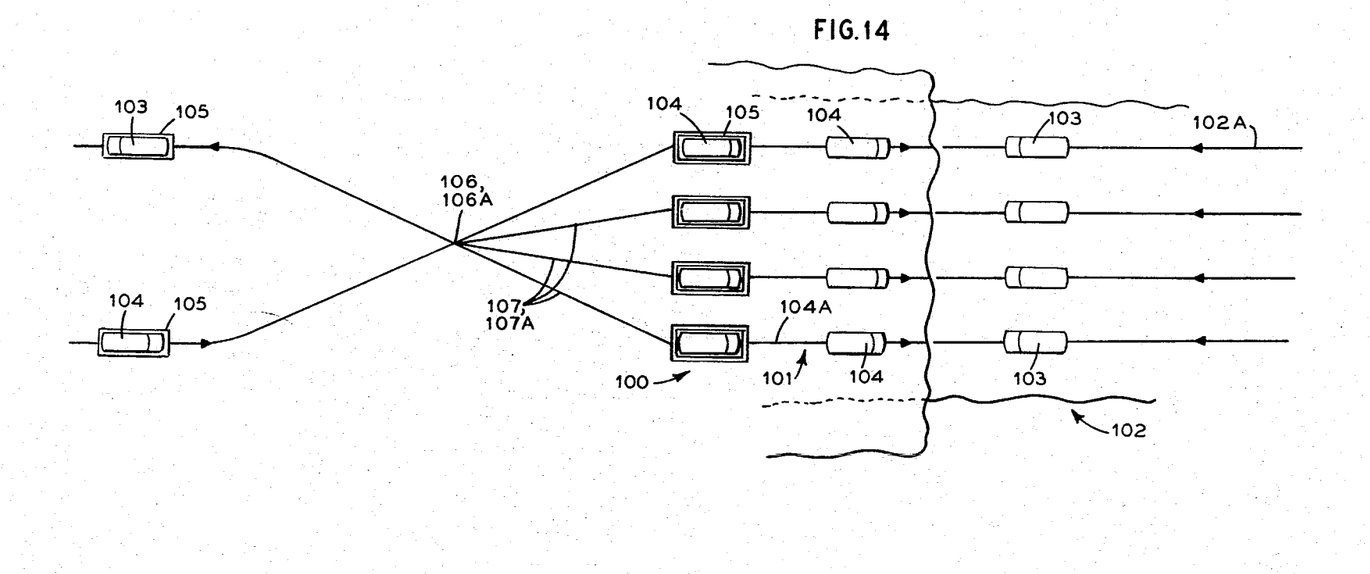
FIG. 14 is a plan schematic view showing a further embodiment of the invention.
Figure 15:
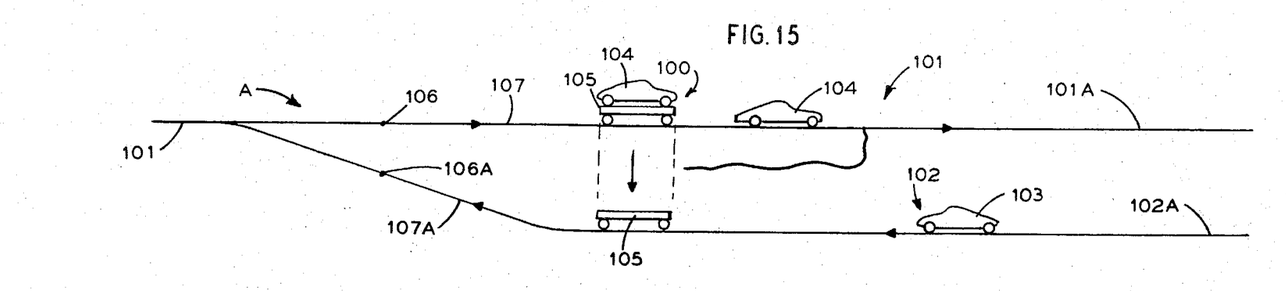
FIG. 15 is an elevational view thereof.

Still another embodiment of the invention is shown in FIGS. 14, 15, wherein loaded and unloaded pallets 105 at a station 100 are handled on paths 101 at an upper level 101A and paths 102 at a lower level 102A. Thus, pallets 105 carrying vehicles 104 move on path 104A to point 106 where they fan out in lanes 107 to station 100. Here the vehicles 104 are driven off pallets 105.

The unloaded pallets 105 at station 100 are moved to the depressed level 102 to receive incoming vehicles 103. The loaded pallets 105 then fan out on converging lanes 107A and move to point 106A where they serially move on artery 103A. Thus, traffic flow may be maintained on arteries 103A and 104A without interference in respect to vehicles 103, 104.

Figure 16:
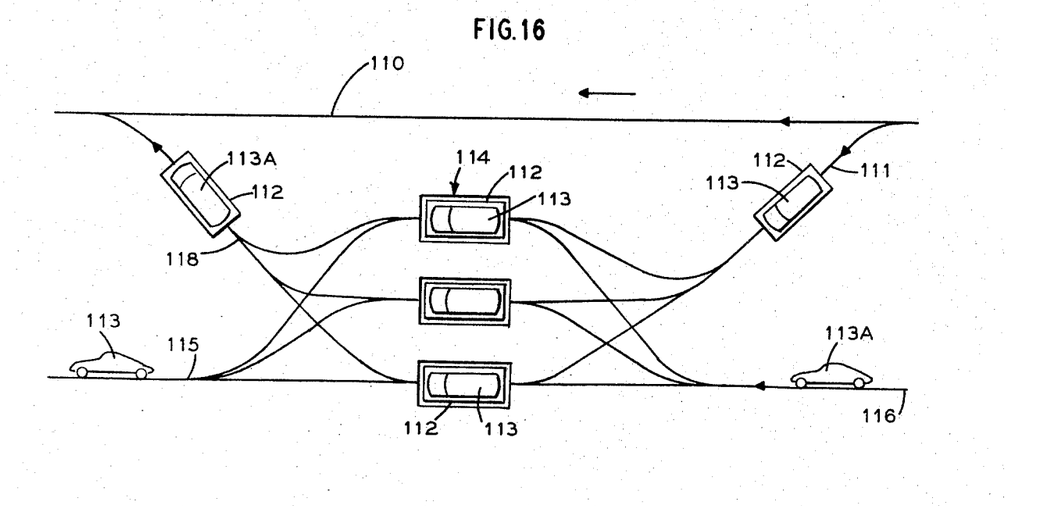
FIG. 16 is a plan schematic view showing another embodiment of the invention.
Figure 17:
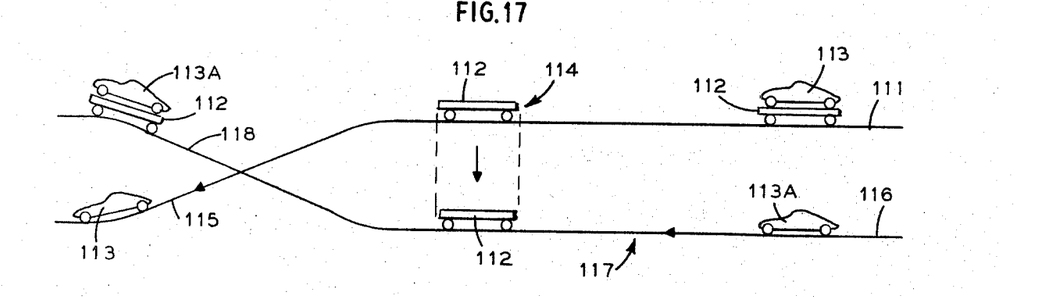
FIG. 17 is an elevational view thereof.

A further embodiment of the invention is shown in FIGS. 16, 17. Here a main artery 110 has a branch lane 111 for passing switched pallets 112 carrying vehicles 113 to a station 114 where the pallets 112 are unloaded, vehicles 113 moving thereafter on path 115. The unloaded pallets 112 at station 114 are moved vertically downwardly to a depressed level 117 where vehicles 113A move on path 116 to the vacant pallets 112 for loading the same. The thus loaded pallets 112 carrying vehicles 113A move on a path 118 to rejoin main artery 110.

Here again, the pallets 112 may leave and enter main artery 110 without cross traffic and thus facilitates loading and unloading operations.

It is understood that stations 100, FIGS. 14, 15 and stations 114, FIGS. 16, 17, are provided with temporary support means for the pallets, and which operate in conjunction with the pallet transferring means moving between the vertically spaced levels, as previously described, see FIGS. 7, 8.

I claim:

1. In a vehicle handling system for vehicles traveling in a pair of lanes in respectively opposite directions, carrier means for respectively carrying said vehicles arranged for serial movement in each lane, a pair of station means located at terminal points at one end of said lanes and a second pair of station means located at terminal points at the other end of said lanes, one of each pair of station means being arranged for unloading carrier means from one of said lanes, the other of each pair of station means being arranged for loading carrier means for the other of said lanes, means for propelling the carrier means in each lane, means for guiding the propelled serially related carrier means on one of said lanes in a plurality of divergent paths from said one lane towards said station means therein, thereafter in a plurality of laterally related paths from said last mentioned station means to the station means in the other of said lanes, and thereafter in a plurality of convergent paths from said last mentioned station means toward said other lane.

2. In a system as in claim 1 wherein the plurality of laterally related paths extending between each pair of station means is at a level different from the level including said pair of lanes.

3. In a system as in claim 1, and further including guide means operative to separate the successive carrier means of one directional path at a given point in said path to direct the movement of the successive carrier means separately and sequentially into individual, angularly related, divergent paths extending beyond said given point.

4. In a system as in claim 3 wherein said guide means comprises electrical means mounted on each carrier means and electrical means extending along paths of movement of said carrier means and cooperative with the electrical means on said carrier means for directing the movement of said carrier means along said paths of movement, said second mentioned electrical means extending along each of the said angularly related, divergent paths, whereby said last mentioned electrical means may be rendered selectively operative in the respective divergent paths to selectively direct the movement of each carrier means in a separate one of said angularly related paths.

5. A system as in claim 1, and further including a station area at one end of said lanes, said area being in substantial alignment with one end of one of said directional paths, a plurality of laterally related carrier loading stations in said station area, a second station area at said one end of said lanes, and in substantial alignment with one end of the other of said directional paths, a plurality of laterally related carrier unloading stations in said second station area, each of said stations comprising an opening in the level of said station areas, a carrier transfer passageway depressed below the level of said station areas and communicating at opposite ends thereof with the openings in said station areas, movable means in each opening for supporting carrier means located within said opening and for transferring said carrier means between the level of said station area and the depressed level of said transfer passageway, and means for guiding the movement of propelled carrier means over determined paths in the depressed level of said transfer passageway between support and transfer means in said carrier loading and unloading stations.

6. A system as in claim 5 and further including movable support means in each of the openings of said stations for temporarily supporting carrier means within said openings until said support and transfer means is operative to engage said carrier means, said movable support means being movable between carrier means engaging and disengaging positions.

7. A system for moving objects in a given path, a plurality of carrier means for respectively carrying an object thereon, said loaded carrier means being arranged for serial movement in said path, means for propelling said carrier means between selected points in said path, a set of multilane station means in communicating relation to said path at each of the points therein, each multilane station means comprising a plurality of laterally related lanes extending in converging relation to a point in said path, and automatic means for sequentially activating the propelling means of successive carrier means to selectively (1) direct carrier means moving on said path respectively in succession to the respective lanes of said multilane station means, or (2) pass carrier means on the respective lanes of said multilane station means in serial succession through said point to said given path.

8. A system as in claim 7 and further including means at each point in said path for moving carrier means from said multilane means to a level other than the level of said path.

9. A system as in claim 7 wherein said path is in a closed loop form, said points forming exit and entrance means for said looped path.

10. A transportation system comprising a pair of paths respectively located on vertically spaced levels, station means at a determined point in said paths, the uppermost of said paths being adapted to pass vehicles in a direction away from said station means, the lowermost of said paths being adapted to pass vehicles in a direction toward said station means, an opening in said uppermost path at said station means, carrier means for carrying a vehicle on said uppermost path toward said station means for location in the opening therein, means for supporting said loaded carrier means in said opening while allowing the separation of said vehicle from said carrier means to permit movement of said vehicle on said uppermost path away from said station means, said unloaded carrier means being movable vertically to said lowermost path to receive and load a vehicle moving on said lowermost path toward said station means, the loaded carrier means thereafter moving from said lowermost path to said uppermost path for continued movement on said uppermost path.

11. A transportation system comprising an endless continuous looped path, a plurality of carrier means for respectively carrying objects and arranged to move serially and unidirectionally in said endless path, means for independently propelling each of said carrier means in said endless path, a plurality of station means located at spaced points along the extent of said endless path, each station means including an exit path of limited length and an entrance path of limited length, said exit path extending from and communicating with said endless path, said entrance path extending from and communicating with said endless path, said exit path and said entrance path being located in opposed relation within said station means, switch means at the juncture of said endless path and said exit path operable for diverting a selected loaded carrier means travelling in one direction on said endless path, to said exit path and into said station means for unloading said carrier means in said station means, and means for shifting said unloaded carrier means from said exit path to said entrance path for loading said unloaded carrier means and allowing for movement of said last mentioned loaded carrier means on said entrance path into said endless path and continued movement thereof on said endless path in said one direction.

* * * * *